(12) United States Patent
Moore

(10) Patent No.: US 6,246,778 B1
(45) Date of Patent: *Jun. 12, 2001

(54) PRODUCT DISTRIBUTION VERIFICATION SYSTEM USING ENCODED MARKS INDICATIVE OF PRODUCT AND DESTINATION

(76) Inventor: Lewis J. Moore, P.O. Box 13027, Charlotte, NC (US) 28270

( * ) Notice: Subject to any disclaimer, the term of this patent is extended or adjusted under 35 U.S.C. 154(b) by 0 days.

This patent is subject to a terminal disclaimer.

(21) Appl. No.: 08/911,415

(22) Filed: Aug. 14, 1997

Related U.S. Application Data

(63) Continuation-in-part of application No. 08/740,656, filed on Oct. 31, 1996, now Pat. No. 5,895,073, which is a continuation-in-part of application No. 08/633,538, filed on Apr. 17, 1996, which is a continuation-in-part of application No. 08/420,034, filed on Apr. 11, 1995, now Pat. No. 5,592,561, which is a continuation-in-part of application No. 08/227,662, filed on Apr. 14, 1994, now abandoned.

(51) Int. Cl.[7] .................................................... G06K 9/00
(52) U.S. Cl. ........................................ 382/103; 340/825.3
(58) Field of Search ................................. 392/100, 103, 392/112, 143, 317; 356/71; 340/825.3, 825.34

(56) References Cited

U.S. PATENT DOCUMENTS

| | | | |
|---|---|---|---|
| 4,558,318 | * 12/1985 | Katz et al. .................... | 340/825.34 |
| 4,742,340 | * 5/1988 | Nowik et al. .................... | 340/572 |
| 4,862,143 | * 8/1989 | Hirshfield et al. .................... | 340/572 |
| 5,283,422 | * 2/1994 | Storch et al. .................... | 235/375 |
| 5,390,251 | * 2/1995 | Pastor et al. .................... | 380/21 |
| 5,592,561 | * 1/1997 | Moore .................... | 382/103 |

\* cited by examiner

*Primary Examiner*—Andrew W. Johns
(74) *Attorney, Agent, or Firm*—Bracewell & Patterson, L.L.P.

(57) ABSTRACT

A system and method of marking goods for authentication and tracking purposes is described. The system and method include a central control which enables the system. The method and system are accomplished in real time affording manufacturers the ability to eliminate problems associated with counterfeiting and diversion which begin at one or more manufacturing site which are remote from central control. A central control unit enables the system by providing an allotment of marks to one or more host units. Each host unit directs marking terminals to mark, at locations remote from the host units, particular goods or packages with specific information encoding symbols. Items are preferably marked directly, but alternately can be identified by means of affixed fixtures which are marked with encoding symbols either prior to, or subsequent to, affixing to the items. Following marking, items are scanned to insure proper marking. Once within the commerce stream, items can be checked by illuminating the symbols marked thereon and cross referencing this data with the host database by using a field reading unit, or alternately decoded into clear text at the field reader for analysis.

37 Claims, 5 Drawing Sheets

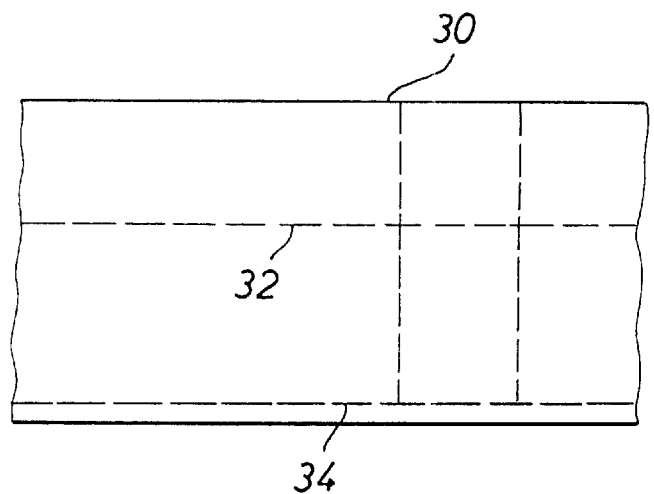
FIG. 2
FIG. 3
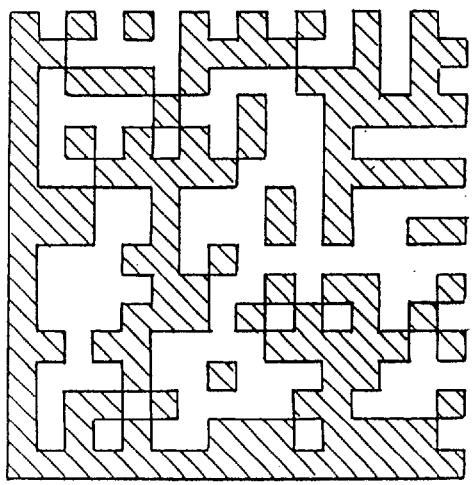
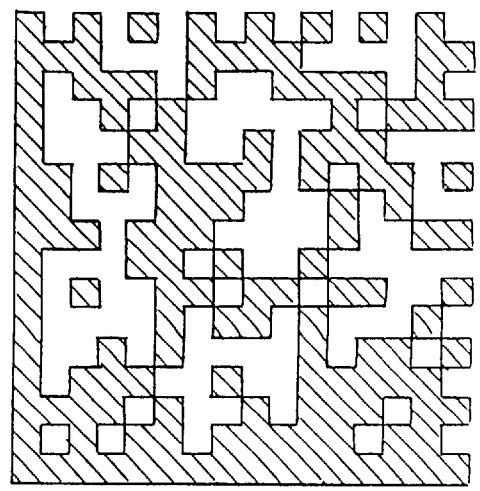
FIG. 3a

US 6,246,778 B1

PRODUCT DISTRIBUTION VERIFICATION SYSTEM USING ENCODED MARKS INDICATIVE OF PRODUCT AND DESTINATION

This is a continuation-in-part application of U.S. Ser. No. 08/740,656 filed on Oct. 31, 1996, now U.S. Pat. No. 5,895,073 which is a continuation-in-part of U.S. Ser. No. 08/633,538 filed on Apr. 17, 1996, which is a continuation-in-part of U.S. Ser. No. 08/420,034 filed on Apr. 11, 1995 now U.S. Pat. No. 5,592,561, which is a continuation-in-part of U.S. Ser. No. 08/227,662 filed on Apr. 14, 1994, now abandoned.

FIELD OF THE INVENTION

The present invention relates to an authenticating, anti-counterfeiting, and anti-diversion tracking system. More particularly, the present invention relates to a system for controlling and enabling the marking and controlling the marking of goods, such as basic materials or articles of manufacture or packaged goods, with a unique mark, symbol, or pattern for subsequent detection to determine such information as the final point of distribution of authentic goods, the amount of unmarked goods in the market, i.e., counterfeit goods, the source of entry of the unmarked goods, the authenticity of the goods, the product distribution channels for the goods, the durability and/or lifetime of the goods, and other information such as time and location of manufacture. The present invention further relates to the marking, tracking, and authenticating of documents such as shipping invoices.

BACKGROUND OF THE INVENTION

In the commercial manufacturing world, it is not uncommon for counterfeit goods to be manufactured, distributed, and sold in direct competition with authentic goods. Counterfeiting has reached epidemic proportions worldwide, especially in the area of consumer goods including goods made from fabric, plastic, leather, metal, or combinations thereof such as clothing, handbags and wallets, perfumes, and other consumer goods. Counterfeiting of financial documents such as bank drafts or "checks" is also widespread in that both the check document as well as the affixed signature can both be of questionable authenticity.

It is common for the counterfeit articles to be of high quality and closely resemble authentic articles. Indeed, counterfeit articles can so closely resemble genuine goods that consumers readily confuse the counterfeit articles with the authentic articles. Thus, there exists a need for a system and method which enable a manufacturer to encode data represented by a mark or symbol, to direct marking of goods with the mark or symbol, and to enable remote inspection stations to check goods, whether articles of manufacture or basic material or financial instruments, for authentic marks or symbols and track authentic goods. Heretofore, such a comprehensive system was not available.

For example, certain known systems suggest marking goods with different patterns. However, such systems do not suggest a system that directs the marking of goods with a selected mark and the detection of the marks at remote locations. The patents described below represent the art in the area of marking and detecting goods.

Problems encountered in the distribution of goods is not limited to the distribution of counterfeit goods. The clandestine or illegal diversion of the shipment and distribution of authentic goods presents a major problem in modern commerce. Goods manufactured at one location might be subject to controls, such as a tax, if distributed at a second location, but might not be subject to a tax if distributed at the location of manufacture or even at a third tax free location. Tobacco products, alcoholic beverages, drugs and a wide variety of other goods and products fall into this category. Stated another way, authentic merchandise can become contraband if illegally distributed, diverted or "smuggled".

As an example of a problem in the distribution of authentic goods, consider tobacco products. A tobacco product or "production module" such as cigarettes, made by a legitimate manufacturer, might be taxable when sold in one state and not taxable when sold in another state. As a more specific example, cigarettes sold in the state of North Carolina are not subject to any excise tax. The same cigarettes sold in the state of New York are subject to an excise tax of, say, twenty five cents per pack of cigarettes. Tobacco companies typically increase the "wholesale" price of the cigarettes shipped to distributors in New York, and pay the excise tax directly to the taxing New York entity. Retailers in the state of New York compensates for the increased wholesale price by charging a higher retail price. Tobacco companies do not pay excise tax on cigarettes destined to be sold in North Carolina because no tax is due. As a result, the wholesale price of a pack or carton cigarettes in North Carolina is lower than the wholesale price for the same pack or carton in New York. If, however, cigarettes destined to be sold in North Carolina were illegally diverted to New York and sold at the New York retail price, an additional twenty five cents per pack profit would be illegally made by the New York distributor or retailer, and the New York taxing entity would loose twenty five cents per pack in revenue.

As illustrated in the example, there is a need to be able to track authentic goods based upon their destined point of final distribution. There is a further need to be able to mark and track the goods by packaging or "package module". In the example if only package modules comprising "cases" of multiple cartons of cigarettes were tracked, unscrupulous distributors could distribute contraband cartons of cigarettes to be sold by the carton or to be subdivided and sold by the pack. Authorities would have no means for tracking contraband cartons or packs of cigarettes. Even if the product were marked and tracked down to the carton package module, individual packs of cigarettes could be retailed illegally with no means for detection. It is, therefore, desirable to mark all package modules for tracking. In the example, this would include marking package modules down to the cigarette "pack" level.

U.S. Pat. No. 5,289,547, issued on Feb. 22, 1994, discloses a method for authenticating articles including incorporating into a carrier composition a mixture of at least two photochromic compounds that have different absorption maxima in the activated state and other different properties to form the authenticating display data on the article, subjecting the display data to various steps of the authenticating method, activation of all photochromic compounds, preferential bleaching of less than all of the photochromic compounds, and/or bleaching of all the photochromic compounds, and subsequent examination of the display data following the various activation and bleaching steps by verifying means to enable authentication.

U.S. Pat. No. 4,767,205, issued on Aug. 30, 1988, discloses an identification method and identification kit based upon making up groups of microsized particles normally visible to the naked eye with each particle in each group being of a selected uniform size, shape and color. Coded identification is established by transferring a population of particles from a selected number of the groups to the item to be identified and then confirming such identification by examining the marked item under high magnification with a light microscope.

U.S. Pat. No. 4,623,579, issued on Nov. 18, 1986, discloses a decorative composite article which may be longitudinally slit to form a yarn product which has a combined phosphorescent and fluorescent decorative appearance. The composite article includes paired outer layers of a thermoplastic resin between which is disposed a decorative layer comprising a composition including a colorant component having a phosphorescent colorant and a fluorescent colorant, and a resin binder material. The fluorescent colorant is present in an amount by weight that is up to an amount equal to that of the phosphorescent colorant. The present binder material may be selected from polyester, polyurethane and acrylic polymers and copolymers, with a mixture of butadiene-acrylonitrile rubber and polyurethane composition being preferred. The composite article is prepared by coating two resin films with the composition, followed by contacting the films with each other on their coated surfaces and applying heat and pressure to bond them together to form the decorative composite article.

U.S. Pat. No. 3,942,154, issued on Mar. 2, 1976, discloses a method and apparatus for recognizing colored patterns. The method includes encoding the colors of individual picture elements in a fabric pattern by comparing the level of transmittance or reflectance of the picture element at pre-selected wavelengths with stored values representing a reference color to generate a multibit code indicative of the color of the picture element. A comparator used for this purpose incorporates an error either proportional to the wavelength or of constant value so that the output of the comparator will indicate identity with the stored value if the input value for the picture element is within a certain range of the stored value.

U.S. Pat. No. 3,839,637, issued on Oct. 1, 1974, discloses the impregnation of spaced courses of yarn in a fabric with a material which is not visible under daylight, but which is visible only when subjected to ultra-violet light, so as to provide guide lines for cutting, or measuring indicia to enable visual counting of the number of yards of cloth in a roll from the end thereof without the necessity of unrolling the bolt.

U.S. Pat. No. 3,701,165, issued on Oct. 31, 1972, discloses a method of marking garments with a substance detectable by magnetic detecting devices. When the magnetized substance on the garment part is detected in a process of making garments, subsequent garment making steps are actuated in response to the detection of the stitching.

U.S. Pat. No. 5,289,547, issued on Feb. 22, 1994, discloses a method of cutting a sheet with a tool controlled by a computer system and in accordance with a cutting program wherein an operator marks certain particularities directly on the sheet using a fluorescent marker, the sheet is exposed to ultraviolet light while being scanned by a camera, the marking being interpretable as constraints on cutting to be taken into account by the cutting program, and cutting occurs following the instructions interpreted from the encoded pattern.

U.S. Pat. No. 3,991,706, issued on Nov. 16, 1976, discloses an automatically controlled cutting machine having a support table on which limp sheet material is spread for cutting by means of a cutting tool and includes a marking apparatus to identify key points on pattern pieces cut from the sheet material. The cutting tool and the marking apparatus are mounted on a tool platform for movement to any desired location over the sheet material. The marking apparatus utilizes a needle which is suspended above the sheet material and a dye thread which is laced through an eyelet in the depending end of the needle. Each time a mark is to be generated, the needle plunges downwardly through the sheet material, and dye on the thread is rubbed onto the material at the point under consideration. An indexing mechanism operated with the reciprocating movement of the needle pulls a finite length of thread through the eyelet after each marking operation.

Thus, there remains a need for a system and method for controlling, enabling, and directing marking of goods during the manufacturing process and enabling detection/cross-validation of the marks so that the goods are uniquely identified and tracked throughout the stream of commerce. Still further, the marks should specify the final point or points of distribution of the goods. In addition, goods should be marked so that the markings are not readily observable and so that the markings contain sufficient information for product authentication, identification, and tracking. Furthermore, the markings should be durable and preferably resistant to normal wear and abrasion encountered in the manufacture, packing, shipping, distribution, portage and use of the goods by the final consumers. Still further, the markings should be relatively difficult to remove and, if removed, should preferably render the goods essentially unusable or in a condition which prevents distribution or sale.

SUMMARY OF THE INVENTION

The present invention provides an authenticating, tracking/anti-diversion, and anti-counterfeiting system which can track various goods. The system includes a control or "master" computer, one or more host computers which cooperate with the control computer, a marking system, and a field reader system, which are all compatible and can be physically linked via data transmission links. An identifiable mark is placed on the goods, products, packages of goods, or on materials out of which the goods are to be made, which enables subsequent inspection. The goods or packages can be field inspected with a field reader to determine the authenticity of the goods or to track the distribution of the goods and to determine the final point of distribution of the goods or packages of goods.

In one embodiment of the invention, marks identifying the final destination or point of distribution of a product is placed upon multiple package modules of a product. Package modules can be defined as containers, or containers within containers, of a product. Using the cigarette as an example, the first typical package module for cigarettes is a pack or twenty cigarettes, the second package module is a carton of ten packs of cigarettes, the third package module is a crate containing a one hundred cartons, the forth package module might be a "land-sea" type trailer container containing a specified number of boxes, and so forth.

In another embodiment of the invention, an identifiable mark is printed on a financial document, such as a shipping invoice, using ink not visible to the naked eye in normal light. When the invoice is presented for processing, it is placed in an on-site or "field" reader which captures the mark and decodes the mark to preferably an ASCII string. The field reader then transmits the ASCII string to a host mainframe computer wherein the mark is compared with marks residing in a database in the host computer. An authenticating match, and a final destination match, of the captured mark may or may not be obtained from the comparison. Results of these comparisons are then transmitted back to the field reader and displayed preferably in clear text.

In still another embodiment of the present invention, inspection uses light outside the visible spectrum to briefly illuminate marks on the goods under inspection. Through the use of responsive chemical agents such as dyes, that on exposure to non-visible light undergo a chemical, physical, and/or chemical-physical transformation making the marks detectable, an inspector can quickly determine whether the accused goods are marked and, if so, whether the mark is authentic. A mark, symbol, or pattern encoding input data conveying information about the goods is applied directly to the goods or to the material out of which the goods are to be made. The unique mark, symbol, or pattern encoding specific identification data can be tailored to meet the needs of a particular manufacturer. The mark contains specific information which is unique to the goods, not readily observable in visible light and which can be rendered detectable and readable upon exposure to non-visible light.

The preferred marks or patterns include areas where a marking agent or etching is applied and areas where it is not applied. Using the appropriate ink and illumination system, marks, which are invisible under normal light conditions, can be "overprinted" on existing visible marks. The pattern can be scanned or captured by a reader and deciphered into encoded data. The entry can then either be compared directly to a set of authentic entries on a database or decoded and the decoded data compared to a set of data on the centrally located host database. In comparing captured patterns with authentic patterns within a host database, the total pattern can be transmitted to the host, or alternately, the pattern image can be decoded by the field reader and transmitted as an ASCII string to the host for authentication. In still another embodiment, the symbol pattern is decoded by the field reader and identified with readable or "clear" text on a screen of the field reader. In this embodiment, authentication of the mark is not made at the host computer.

The system of the present invention is generally comprised of a control or "master" computer, one or more host computers, one or more marking systems cooperating with each host computer, such as a printer or etching laser, and a reading system typically comprising a plurality of readers. The host computer stores the specific, selected information conveyed by the mark or symbol and directs the marking system to imprint the mark or symbol on the package modules of manufacture, and also receives and processes information from the reading system. Alternately, the marking system can imprint the mark or symbol on an item which is subsequently attached permanently to the article of manufacture or package module. Each host computer is connected via modem to coordinate, receive, and respond to commands sent and received from the control computer, a marker terminal, and a reading terminal.

In operation, the control computer contacts a host computer and enables a specific number of imprints. The host computer establishes an appropriate identifying message, using clear text, such as the final point of distribution of the package module. The host interfaces with an encryption unit which converts the clear text message into an ID matrix symbol. The host then downloads the digital symbol to the CPU controlling the marker. The host also establishes marker start/stop serialized numbers and specific times the marker can be in operation. Once the marking cycle begins, a CCD camera mounted downstream from the marker maintains a continuous validation step that an appropriate symbol is being printed onto the product. If the printed symbol is different from that provided by the CPU, an error signal is activated to alert the operator. At the conclusion of the marking cycle, the marker CPU uploads a print count to the host.

From this point forward, marked products or package modules can be identified and verified through the use of field readers. The symbol can be imprinted, etched, embossed or otherwise placed preferably directly on the package module or, alternately, can be imprinted or etched on a fixture which is permanently or temporarily affixed to the module. Hang tags, attached labels, and other symbol carriers will suffice. The products are identified and verified by using a light of appropriate wavelength to illuminate the symbol on the products. The illuminated symbol is captured by the camera. The captured image is then transferred to a portable PC where the data is enhanced if necessary, compressed, and transmitted via modem, cellular link, or satellite communication to the host.

The host computer receives the data from the field reader, interfaces with the encryption unit where the message is decoded and converted to clear text. The host computer then searches the database to validate the identifying message. Once validated, the host computer sends a message back to the field reader which displays the decoded message and any other pertinent information pertaining to this specific product. If the marked product is counterfeit, or if the marked package module is found to be authentic but is not at the proper point for distribution, an invalid signal is transmitted and displayed on the field reader computer screen. Alternately, the symbol can be decoded within the field reader computer, and the decoded data can be displayed on the field reader computer screen. In this embodiment, no comparison is made in the host computer.

To further enhance security, all transmissions between the control computer, host computers, marker CPU, and field readers are conducted through enigma cards placed in each computer at the time of manufacture and initialized when the network is activated.

The control computer provides an allotment of prints or markings to the host computer. This communication is carried out via corresponding enigma cards which are located in the respective computers. Once each host computer has received an allotment of marks, it is able to enable marking systems to imprint marks on the articles or package modules as specified. Each host computer is limited in its ability to enable the marking systems to impart marks to the extent that the control computer has provided to the host the requisite number of marks to cover the directions sent to the marking systems. As an example, only a controlled and specified number of package modules can be printed with final point of distribution marks at a given manufacturing facility. Using the disclosed invention, even an employee of the manufacturing company can not, therefore, clandestinely manufacture additional unauthorized or "counterfeit" package modules with authentic identifying and destination marks.

Each host computer interfaces with the encryption unit to generate a data matrix symbology which represents specified information that the manufacturer selects represented by the mark or symbol. Selected information, which represents the mark or symbol, is entered into the host terminal. The encoded mark or symbol is sent via modem to a specific manufacturing site where the encoded mark or symbol is received by the marker terminal and is etched, printed, or otherwise transferred onto material or package modules at the marking location which is remote from the control computer. This matrix is downloaded to the marking system for marking the goods. Following the placement of the print, a verification of the printed mark is conducted by a camera which compares the mark as printed with the mark directed by the printer PC. The goods can then be scanned by a field reader to verify authentic marks. Once the reader has captured the data from the scanned mark, communication is established by the reader with the host computer. The host computer compares the scanned mark with marks in its database to determine the authenticity of the mark or to track the goods.

The present invention provides a method for controlling and enabling the authentication and tracking of consumer goods to reduce the amount of counterfeit goods and to reduce the shipping of authentic goods to unauthorized points of final distribution. The method includes generating a unique pattern comprising an encoded input data entry stored on a mass storage device accessible by a CPU where the input data comprises a final point of distribution and a unique manufacturer identifier, and where the encoded data entry comprises a digital encoding of the input data. The unique pattern is preferably applied to package modules of the goods using an ink formulation comprising one or more chemical agents detectable when exposed to a visible or non-visible wavelength range of light. Non-visible ink can be selected such that the pattern can be "overprinted" on other marks which are visible under normal light conditions, and these overprinted marks can subsequently be read without interference from the visible markings. Alternately, the pattern is applied to the goods or package modules by other methods such as etching, printing, painting or embossing. The method further comprises exposing the package modules with light in the visible or non-visible frequency range thereby making the pattern detectable, scanning the detectable pattern on the goods, decoding the pattern to retrieve the encoded data, and comparing the encoded data against stored encoded input data entries in the mass storage device data to determine if the goods are authentic and if the specified destination is correct.

The present invention provides a method for marking the final point of distribution of consumer goods to reduce the amount contraband shipment of authentic goods and a method for verifying the final destination of authentic goods, including a means for generating a unique pattern comprising an encoded input data entry stored on a mass storage device accessible by a CPU where the input data comprises at least a unique destination identifier and where the encoded data entry comprises a digital encoding of the input data, a means for applying the unique pattern to the goods using an ink formulation comprising one or more chemical agents detectable when exposed to a visible or non-visible frequency range of light, a means for exposing the goods with light in the visible or non-visible frequency range thereby making the pattern detectable, scanning the detectable pattern on the goods, a means for decoding the pattern to retrieve the encoded input data entry, and a means for comparing the encoded input data entry against all stored encoded input data entries in the mass storage device data to determine whether the goods are authentic and properly distributed.

The present invention also provides a method for authenticating consumer goods to reduce the amount of counterfeit goods including entering input data comprising at least a unique owner identifier and/or a unique manufacturer identifier into a CPU, encoding the data in a machine readable format, storing the data in a mass storage device accessible to the CPU, generating a unique pattern incorporating the encoded input data, and applying the unique pattern to the goods using an ink formulation comprising one or more chemical agents detectable when exposed to a visible or non-visible frequency range of light. Alternately, the unique pattern can be etched or embossed directly on the goods, or printed, painted, etched, or embossed on a fixture which is permanently affixed to the goods. The authentication process is completed by exposing the goods to light in the visible or non-visible frequency range thereby making the pattern detectable, scanning the detectable pattern on the goods or on a fixture affixed to the goods, degenerating the pattern to retrieve the encoded input data, transmitting the total image pattern or alternately transmitting a representative ASCII string, decoding the encoded data to retrieve the input data, and comparing the input data against all stored input in the mass storage device data to determine whether the goods are authentic. Alternately, the scanned pattern can be directly decoded in clear text for display and for evaluation at the location of scanning, and without comparison against marks stored in the host computer database.

The present invention also provides an authenticating system including a means for entering input data comprising at least a unique destination identifier and/or a unique owner identifier and/or a unique manufacturer identifier into a CPU, a means for encoding the data in a machine readable format, a means for storing the data in a mass storage device accessible to the CPU, a means for generating a unique pattern incorporating the encoded input data, a means for applying the unique pattern to goods or the package modules of goods or to a fixture attached thereto by etching, painting, embossing or by printing using an ink formulation comprising one or more chemical agents detectable when exposed to a non-visible frequency range of light, a means for exposing the goods with light in the non-visible frequency range thereby making the pattern detectable. The present invention also provides a means for scanning the detectable pattern on the goods, a means for degenerating the pattern to retrieve the encoded input data, a means for decoding the encoded data to retrieve the input data, and a means for comparing the input data against all stored input data in the mass storage device to determine whether the goods are authentic and are at the specified final point of distribution.

The present invention further provides a method for monitoring goods in a market including generating a unique pattern comprising an encoded input data entry stored on a mass storage device accessible by a CPU where the input data comprises one or more of a unique owner identifier, a unique manufacturer identifier, a unique plant identifier, a unique destination identifier, a unique lot number, an unique article number, and time and date information and where the encoded data entry comprises a digital encoding of the input data, applying the unique pattern to the goods, or to a fixture attached to the goods, by etching, embossing, painting or printing using an ink formulation comprising one or more chemical agents detectable when exposed to a visible or non-visible frequency range of light, exposing the goods with light in the visible or non-visible frequency range thereby making the pattern detectable. The present invention further provides means for scanning the detectable pattern on the goods or fixture attached thereto, degenerating the pattern to retrieve the encoded input data entry, and decoding the encoded data to retrieve the input data to confirm shipment data.

The present disclosure provides an authenticating and/or tracking system in which a mark, symbol, or pattern is placed on goods or package modules of goods, or alternately placed on a fixture attached to the goods or package modules of goods, wherein the symbol does not detract from the aesthetics of the packaging of the goods or package modules of the goods. Preferably, the symbol is not visible on the module packaging under normal light conditions. Likewise, it is preferred that the symbol be relatively resistant to removal by abrasion during the manufacture, packing, shipping, distribution and use of the goods and package modules of the goods. Still further, it is preferred that the symbol be relatively immune to tampering and removal, preferably rendering the article to which it is attached relatively useless if removed. The symbol may be detectable in visible light or, alternately, only detectable upon exposure to certain wavelengths of non-visible light such as UV light, IR light, microwaves, radiowaves, or other frequencies of light.

BRIEF DESCRIPTION OF THE DRAWINGS

For a more complete understanding of the present invention and the features and advantages thereof, reference is now made to the Detailed Description in conjunction with the attached Drawings, in which:

FIG. 2 shows a portion of an item and a location for applying the encoded patterns or symbols;

FIG. 3 shows a representative symbol placed on an item;

FIG. 3a shows a representative symbol placed on an item;

DETAILED DESCRIPTION OF THE PREFERRED EMBODIMENTS

The system of the present invention generally comprises four components: (1) a control or "master" computer which is located at a central location and which enables the entire system; (2) preferably a plurality of host computer located at a geographically diverse locations; (3) a plurality of marking systems cooperating with each host computer; and (4) preferably a plurality of portable field readers cooperating with each host computer.

Figure 1A:
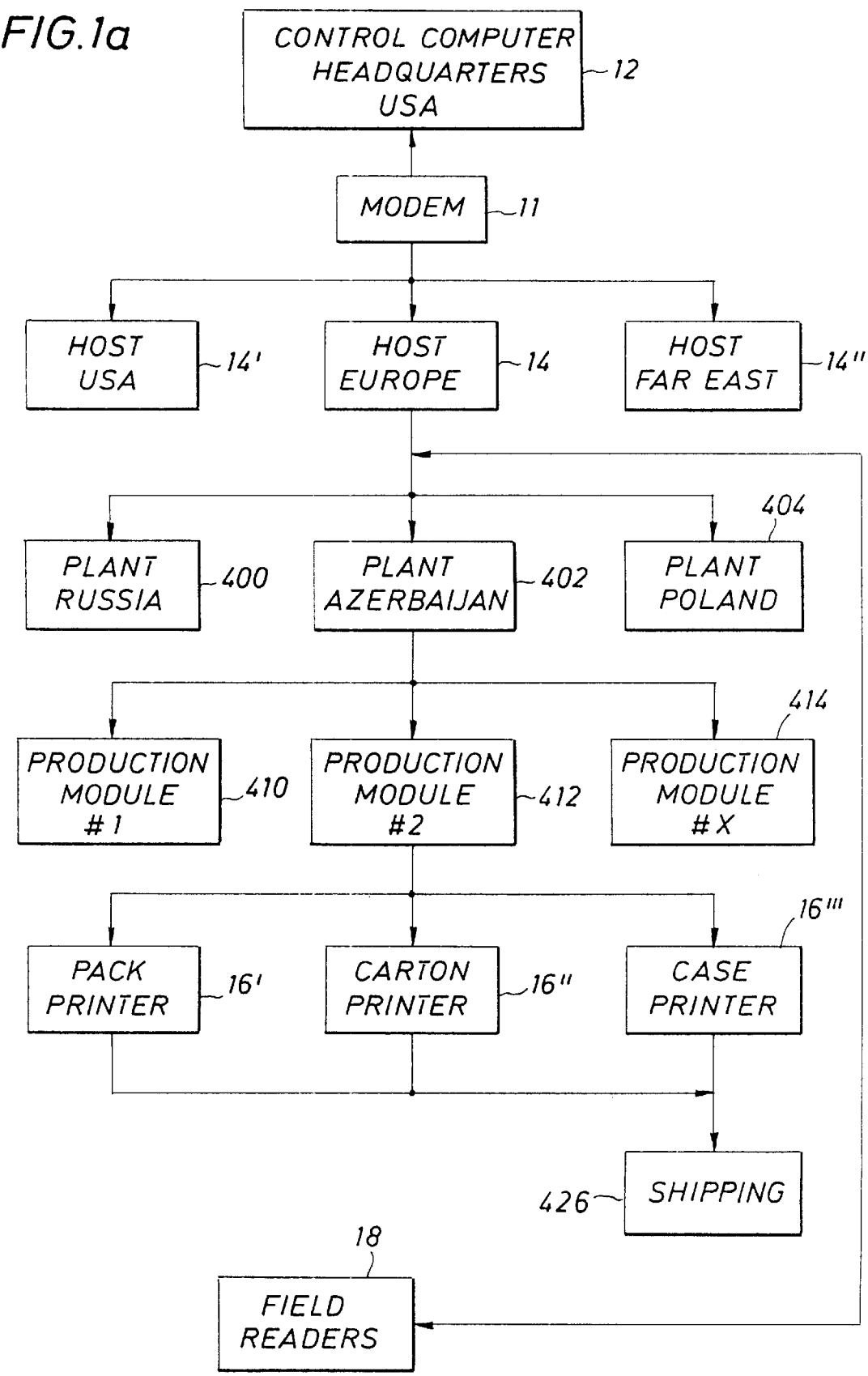
FIG. 1a illustrates the geographical layout and major components of the invention, including a plurality of host computers at remote locations, using a functional block diagram.

FIG. 1a illustrates the layout of the invention using a functional block diagram. Assume, for purposes of discussion, that the invention is being used by a tobacco company to track and authenticate its products throughout the world. The components communicate so that one or all components can be located at sites far removed or "remote" from one another. In the example shown in FIG. 1a, the control computer 12 is located at the company headquarters in the United States. The control computer cooperates with a plurality of host computers through a modem 11. Three host computers 14', 14 and 14" are shown as being at geographical locations in the United States, Europe, and Far East, respectively. For example, the host computer 14' is typically located at one site, such as Paris, and serves a plurality of remote facilities such as tobacco product manufacturing plants 400, 402, and 404 located in Russia, Azerbiajan and Poland, respectively. The host computers 14' and 14" serve a plurality of plants within the United States and the Far East region, respectively.

Still referring to FIG. 1a, each plant typically manufactures a plurality of products or production modules. As an example, first, second and any number "X" of production modules 410, 412 and 414 for the plant 402 in Azerbaijan might include cigars, cigarettes, and pipe tobacco, respectively. Products from each production module are packaged in a plurality of packaging modules. As an example, cigarettes produced by production module 412 are packaged in packs of twenty cigarettes, which are then packaged in cartons of ten packs, which are then packed in cases of 100 cartons for shipping. This sequence or method of creating packages of packages of packages, etc., will be referred to as "sized" packaging of goods. In the preferred embodiment of the invention, printing systems 16', 16" and 16'" are used to mark the cigarette product at the pack package module, the carton package module, and the case package module, respectively. Cases, or alternately cartons or even packs are shipped at step 426 to prescribed final points of distribution and sale. In the example shown in FIG. 1a, the final points of distribution are locations served by the Azerbiajan plant 402. Field readers 18 at the points of final distribution are used to scan the marks on the shipped package modules. Results of the scans are transmitted to the host computer 14 for verification of authenticity and to verify that the package modules are, in fact, destined for distribution in Azerbaijan and not, as an example, for distribution in Poland which might have a higher tax on the product. Details of this step will be presented in subsequent sections of this disclosure.

As shown in FIG. 1a, components of the system communicate with one another so that the control computer 12 enables the entire system, the host computers 14, 14', 14" control and monitor the activities of the marking systems 16', 16" 16'", and the reading systems 18 scan the marks and relates the scanned information to the cooperating host computer to validate the encoded marks at remote field observation sites. The marking system also reports its marking activities to its host computer at predetermined times and intervals.

Figure 1B:
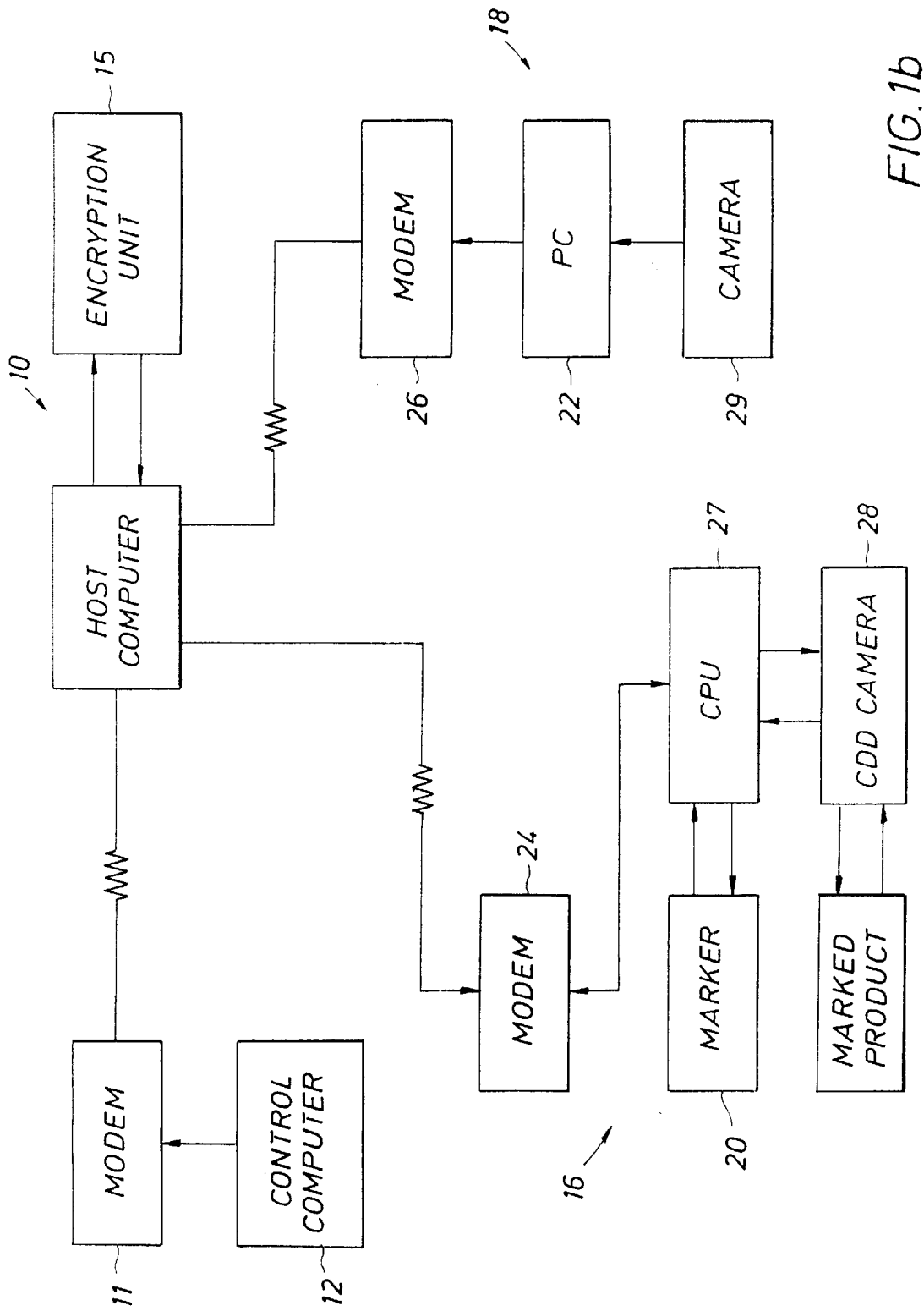
FIG. 1b is a schematic block diagram showing a portion of the system, utilizing a single host computer, which both marks items with encoded patterns or symbols, stores the patterns or symbols in machine readable format for easy recall and comparison, and inspects garments in accordance with the teachings of the present disclosure.

FIG. 1b provides a more detailed schematic diagram that represents a single host computer 14, and related components, of the present invention. In FIG. 1b, the numeral 10 generally identifies the authenticating, anti-counterfeiting, anti-diversion system for marking and tracking goods. The single host computer is identified by the numeral 14, and stores the specific, selected information conveyed by the mark or symbol and directs the marking system 16 to imprint the mark or symbol on the package module, and also receives and processes information from the reading system 18. The host computer 14 is connected via modem 11 to coordinate, receive, and respond to commands sent and received from the control computer 12, and also connected to a marker terminal or processing unit CPU 27 and to a reading terminal 22, preferably a personal computer.

For purposes of discussion, it will be assumed that the marking system 16 is a printing system, and that the marker 20 is a printer. In operation, the control computer 12 contacts the host computer 14 and enables a specific number of imprints, i.e., 100,000. The host computer establishes an appropriate identifying message using clear text. The host computer 14 interfaces with an encryption unit 15 which converts the clear text message into an ID matrix symbol. The host computer then downloads the digital symbol to the marker CPU 27 controlling the marker 20 which, for purposes of discussion, is a printer. The host also establishes printer start/stop serialized numbers and specific times the printer can be in operation, i.e., 0800–1600, Monday through Friday. Once the print cycle begins, a CCD camera 28 mounted downstream from the printer in the marking process maintains a continuous validation that an appropriate symbol is being printed onto the product. If the printed symbol is different from that provided by the marker CPU 27, an error signal is activated to alert the operator. At the conclusion of the marking cycle, the printer CPU uploads a print count to the host.

From this point forward, marked package modules can be identified and verified through the use of the field reader system 18. Typically, a plurality of field readers cooperate with a single host computer 14 and are at locations remote from the host computer 14. It should be understood that the package module or products can be marked directly, or that one or more fixtures can be marked and affixed permanently to the package module. The products are identified and verified by using a light of appropriate wavelength to illuminate the symbol on the products. The illuminated symbol is captured by the camera 29. The captured image is then transferred to the portable PC 22 where the data is enhanced (if necessary), compressed, and transmitted via a modem 26, cellular link, or satellite communication to the host computer 14. Alternately, the captured image can be decoded into clear text using the PC 22 and displayed at the site of the field reader system 18 for visual analysis.

The host computer 14 receives the data from the field reader, and interfaces with the encryption unit 15 where the message is decoded and converted to clear text. Either the total image or an ASCII string representing the image can be transmitted from the field reader 18 to the host computer 14. The host computer then searches the database to validate the identifying message. Once validated, the host computer sends a message back to the field reader 18 which displays the decoded message and any other pertinent information pertaining to this specific product, i.e., place, time of manufacture, or destination. If the marked package module is counterfeit or has been received at the wrong point of final distribution, an invalid signal is transmitted and displayed on the field reader computer screen at the PC 22.

Alternately, if a lower level of security is acceptable, the symbol can be decoded at the field reader system 18 and, at the option of the user, all pertinent goods or product data such as plant of manufacture, style, lot number, destination and the like can be displayed on the field reader computer screen at the PD 22.

To further enhance security, all transmissions between the control computer 12, host computer 14, marker CPU 27, and field reader systems 18 are conducted through enigma cards placed in each computer at the time of manufacture and initialized when the network is activated.

The control computer 12 provides an allotment of marks to the host computer 14. This communication is carried out via corresponding enigma cards which are located in the respective computers. The enigma cards will be discussed in detail below. Once the host computer has received an allotment of marks it enables the marking systems to imprint marks on the package modules or goods as specified. The host computer is limited in its ability to enable the marking systems to impart marks to the extent that the control computer 12 has provided to the host the requisite number of marks to cover the directions sent to the marking systems. The host computer interfaces with the encryption unit to generate a data matrix symbology which represents specified information that the manufacturer selects represented by the mark or symbol. Generally, selected specific information, which represents the mark or symbol, is entered into the host terminal 14. The encoded mark or symbol is sent via a modem 24 to a manufacturing site where the encoded mark or symbol is received by the marker CPU 27 and is printed onto material or goods at this remote marking location. This matrix is downloaded to the selected marking system for use by the marker 20 in marking the goods.

Following the placement of the mark by the marker 20, a verification of the imprinted mark is conducted by the camera 29 which compares the mark as imprinted with the mark directed by the printer PC. As a result of this marking, the goods or package modules can be scanned by a field reader 18 to determine the presence of authentic marks. Once the reader has captured the data from the scanned mark, communication is established by the reader with the host computer 14. The host computer 14 compares the scanned mark with marks entered in its database to determine the authenticity of the mark or to track the goods. The scanned mark can also be decoded into clear text by the reader system 18 and displayed on the screen (not shown) of the computer 22. The host can also download an ID string to the CPU controlling the marker. The PC then uses software to convert the ID string into symbols which are then printed; that is, ABCDE 00001 is converted to a matrix at the printer.

An added feature of the present invention is the real-time nature of validation. Piracy, counterfeiting, and/or diversion commonly occur at the plant or just beyond its gates. The present system allows the functionality of immediate interception on the yard, or the backdoor of the plant. A field reader may be used for inspection at the plant gate to verify that goods going out of the plant gates are authentic, marked, and correctly routed. As a further example, a field reader or point of distribution and sale reader may be used to "instantly" authenticate a package module, invoices, or any marked article at the time of receipt, sale or processing. It should be understood, however, that this can only authenticate the printed document, and can not authenticate any signature affixed thereto which may or may not be forced. The creation and marking of marks is real-time. The marker PC at the site reports back to the host computer and therefore all the markings that have been prepared for the day's operation will be in the archives or in the records of the host computer 14. Immediately after the goods are marked, they can be inspected and a reading determines the (in)validity of the mark through the host computer 14.

The only lag time is that which is required to transmit from a field or point of sale reader to the host then back to the field reader to obtain validation. The field reader remains connected while the host computer decodes and checks the data host for the scanned mark. The reader receives validation while the goods are under the custody and control of the reader operator.

Two pricing accounting/security systems are also provided within the system. First, the control computer 12 enables the host by providing an allotment of marks and tracks the number of marks allotted to the host computer. Second, the host computer allots a prescribed number of marks to the marker and thereby enables the marker to affix marks on the goods or materials. In addition, the host tracks the activity of the markers and counts the marks made at the marking locations.

The present invention ensures that authentic goods are routed to the correct destination. Package modules diverted, and counterfeits lacking the identifying marks, are located. In the case of many products or goods like handbags, trading cards, works of art, or any other article where authenticity adds to the value of the item, the system can be used to guarantee authenticity. Authenticated routing also adds to the value of package modules, insuring that merchandise contained within is not counterfeit. A certificate of authenticity can be provided at the final point of distribution.

The system and method of the present invention is also particularly well tailored for use by customs agencies and clearing houses around the world for quick and easy inspection of goods entering a country, thus facilitating detection of counterfeit and misdirected articles. For example, such information may include information relating to the domestic representative in a foreign destination for the goods.

The central or control computer 12 communicates with the host computer 14 to provide the host computer with an allotment of imprints. The enigma card enables a secure communication to be established between the control computer and the host computer and between the host computer and the marker which is, for purposes of discussion, a printer. The central or control computer 12 can access the host's network to re-enable the host computer 14 with another allocation of imprints. Once the host expends its allotment of imprints, the whole system shuts down. The host must then call the central computer and be re-enabled through the acquisition of an additional allotment of imprints. In a similar way, the host computer 14 can access each printer under its control to re-enable the printer with another allocation of imprints. Once the printer expends its allotment of imprints, the whole system shuts down. The printer must then be re-enabled through the acquisition of an additional allotment of imprints from the host. As an example, unauthorized cases of cigarettes, destined as contraband, can not be marked once the authorized printing allotment has been completed. Any additional allotment must be authorized by selected personnel.

The enigma card has its own microcontroller, random access memory (RAM), and storage capability. It, also has its own program so when the host establishes a connection with the printer location, the host is actually communicating directly through the enigma card. The enigma is constructed to be tamper proof.

The enigma card microcontroller is programmed to manage its own on-board memory. Any writing to the memory is managed by the on-board microcontroller and that on-board microcontroller talks to the PC and the PC talks to the host through the modem.

The enigma card has an on-board security bit that can be set to protect internally programmed software codes and security codes. It is commercially available, having custom software codes and security codes that are not readily readable. The host actually has the same enigma card as the printers located at the manufacturing site. The computer at the printer location, however, may have limited software that limits its ability to use the enigma card.

When the host computer 14 contacts the marker CPU 27 at the printer location, the first step is to establish a coded communication. Once the protocol for the coded communication is set, the printer location enigma card continually monitors either every print or some block of marks created and imprinted at the printer location. The printer location enigma card tracks the number of marks against the allotment from the host computer 14. When the enigma card detects that the allocation of marks for the specified period of time has been exhausted by the printer, then the printer location enigma card immediately prevents additional marking. The printer can no longer operate without authorization from the host computer enigma card to the printer location enigma card.

Marking information at the end of a manufacturing run is transmitted to the host computer 14 via the respective enigma cards before the line is disconnected. This information may include the quality of marking by the printer and the quantity allocated but unused by the printer. At any given time, the host computer 14 can also interrogate a printer and gather this information. This can be done on a random or a spot check basis.

The control computer 12, typically located at the headquarters of the company, periodically updates its own database to reflect the number of imprints allowed by the host computer 14 and marked by the marking system. The control computer serves an internal audit function which tracks the uses of various host computer systems. The control computer downloads an allotment of imprints to the respective host computers. These imprints are then held in the memory of the host computer 14. The host can only enable marking systems to mark the number of marks allotted to its bank. Once this allotment has been depleted, the host computer 14 must once again be enabled by the central or control computer 12 through a replenishment of its internal bank of marks.

The host computer 14 controls the marking process by enabling the marker CPU 27 at the marking location and determining the number of imprints which will be used by the marking system for a particular lot, order, final destination, day, week, month, etc. The host dictates to the marking PC the number of available prints/marks for a particular run. The host controls the manufacturing plant by allocating and tracking the number of goods which will be printed. The allocation and tracking information is, however, established by the control computer 12 and downloaded to the host computer 14. The controller at the marking location will not know what symbol is being printed nor what code is being printed that day. The marker controller has no way of changing the code that is supplied to it by the host computer 14. In addition, the controller may be prevented from reading the code as supplied to it by the host computer 14.

The system is able to allow the host computer 14 to change the code at any time, even during a manufacturing run. The host computer 14 can also interrupt a cycle at any time and change the code. Alternately, such a changes may be made at the control computer 12 level for added security. If the host controller believes that the code has been compromised in some fashion, the code can be changed entirely and the operator at the print location need not be notified of the change. Code changes may be implemented after allotment to the remote marker location when warning flags indicate that the security systems, including the enigma cards, have been compromised or may be done on a random basis. This is possible because the two computers are in communication during the marking run, and the marker operator is unaware of the symbology being printed. The code is preferably changed on a random basis.

The input data, encoded entries, and marks are kept as a confidential collection of data at the headquarters of the manufacturing firm in the control computer 12. Using this approach, specific information can be logged which facilitates tracking the flow of goods and possible identification of counterfeit goods, i.e., goods not marked or not marked properly.

The encryption method is encoded on a microcontroller, using, preferably, a table encryption method. The marker location requires that its enigma card establish a coded communication with the host computer. Once the communication has been established between the enigma cards, then various program files are executed. The host computer 14 then determines how many marks have been used by the marker, enables more marks if needed, removes marks if required, and enables marking for a specified time period.

The enigma card plays a role in providing a starting and an ending accounting number. Any communication with the marker is in a coded format which requires the enigma card to instruct the marker how to make these marks and how many to make.

In the preferred embodiment, a digit code is downloaded to the marker location after the security protocol is established between the host computer and the marker location on the computer enigma card. As soon as verification that a secure transmission link has been established, a coded transmission is then exchanged from the host to the remote marker location.

The conversion of the identifying information into the matrix is accomplished through the use of a computer program. As an example, I.D. Matrix located in Clear Water, Florida provides a patented system for encrypting information and enabling conversion of an alpha/numeric code into the symbology format of the present invention.

Following the creation of the data matrix symbology, the host computer 14 downloads the matrix symbology digitally across a modem, the Internet, or other communication means to the remote marker location. Once the symbology has been encrypted, a pictorial representation of this encrypted message comes up on the computer screen at the host computer 14 for verification and appears as a checkerboard of black and white squares. At that point, the matrix symbology is downloaded to any remote marker location via the enigma cards. At the time downloading occurs, a proprietary system loaded on each enigma card scrambles the digital data to prevent interception of this message. An encryption card is loaded in the host computer's enigma card and a matching encryption card is loaded in the enigma card located at the remote marker location. The transmitted message is then reassembled at the marker location through the encryption chip at the marker location. Once the basic symbology is downloaded, the marker location computer is able to serialize the marks (i.e., 00001, 00002, etc.). This numbering system is an inventory control system as well as a security system because the host computer allocates a number of imprints to the marking system for a particular lot, order, destination, day, week, month, etc.

As an example, the first package module, such as a case of cigarettes, receives the number ABCDE 00001. The second package module receives the number ABCDE 00002 and so on through the marking cycle. These might include product identification, final point of distribution and sale, lot number and the like. Each character (e.g., ID string) represents particular information which is stored in the host computer 14. This serialized marking with selected manufacturing (unique count, plant, destination, date, lot or order) data is printed in the I.D. Matrix format. It should be understood that a particular marking is not limited to the illustrated ten alpha/numeric characters, but can comprise fifty or more characters. Furthermore, it should be understood that the number of alpha/numeric characters used in the markings is limited only by possible size restrictions placed of the matrix symbol mark imprinted on the goods. The marking information is sent back to the host computer 14 with the total inventory number once the manufacturing run has been completed or as the host directs the marker location. In the preferred embodiment, the security code is a ten character code comprised of five alphabetic and five numeric characters.

The marker location computer can request an allotment from the host computer 14, which number is either automatically allocated by the host computer or is specifically requested from the marker location. As added security, the allotment number is verified by the control computer 12. At this point, the marker location is not generating the code, but merely requesting authorization from the host computer 14. The host computer allocates to the marker a quantity of marks. Depending on the degree of control that the host computer requires, it can allocate for one day, one shift, one week, one month, or a whole year. The host-to-marker allocation method is thereby flexible enough to adapt to the needs of the particular type of manufacturing operation.

The host computer 14 maintains a record of the number of marks used by a particular marking system. Recalling that a plurality of host computers are usually employed, the control computer 12 preferably records the number of marks used by each host computer 14. This accounting occurs through the enigma card. The enigma card protects and controls how many copies are made and how many marks are made. The marking system updates the host computer 14 on a periodic basis with respect to the number of marks used during a specified cycle or run. This transfer of information can be programmed to occur on a random basis or at selected predetermined intervals. For example, if the marker is allotted 5000 imprints, but only 4,337 are used at the end of the day, the marker location computer will report back to the host computer that only 4,337 imprints were made. The system, thereby, functions as an inventory control, audit system as well as a security system. This is particularly useful in the context of system licensees. This feature facilitates license agreements on a batch unit basis and keeps strict control over licensees for royalty purposes.

The mark, pattern, or symbol which is applied to the material can be as simple as a logo or brand identifier, but in the preferred form of the present disclosure, the mark, pattern, or symbol includes the encoded data and is typically requested in a symbology format such as the I.D. Matrix format. The data can be quite substantial, including such information as the lot number, a manufacturer identification number, the particular market destination (i.e. the country or state), a product identifier, a company identifier, and time, date, and place of manufacture. The mark can also include data representative of the particular plant in which the goods are manufactured and packaged, and any other information which is represented alphabetically, alphanumerically, graphically, or the like and can be associated with the package modules. As examples, marks for products include final point of sale, and associated financial documents can include account number, sequential identifying numbers, and the like. All such information, i.e., input data, encoded entries, and the marks, are stored in mass storage devices for later use in goods verification/authentication, tracking, and/or counterfeit detection.

As an example, if it is known in advance where the product will be manufactured and packaged, i.e., packaging material is to be shipped to a particular plant for scheduled use, then the time, date and location of the plant are known as well as the product to be made out of the material. Under such conditions, the mark applied to the packaging material can contain this information along with a goods identifier, destination and manufacturer identifier. Using cigarettes as a specific example, one can mark cigarette pack material, carton material and case material with a mark, symbol, or pattern not readily seen on visual inspection. The mark can include chemical agents that are not visible until they are exposed to certain frequencies or wavelengths of visible or non-visible light which render them readable. Such chemical agents can include ultraviolet (UV) or infrared (IR) sensitive dyes. Package modules will then be premarked when filled with cigarettes.

In one embodiment, the symbology is printed using invisible ink so that the operator will have no way of knowing whether a valid symbol has been printed. More specifically IR activated inks are preferred to mark cigarette packages and cartons in that identifying symbols can be overprinted on visible trade markings leaving the packaging of the product visibly unaltered to the naked eye. The identifying symbols can subsequently be read, using appropriate light sources and cameras, without interference from the visible trade markings. A reader, however, is located down the line and scans the marked articles, illuminates the mark and verifies the data matrix indicating that it is indeed a readable mark. The hardware and the software on the ground at the marker determine the number of valid marks imprinted on a particular run of goods.

The marks and symbols are comprised of encoded information represented by an alpha/numeric code. As an example, a ten character alpha/numeric code is entered at the host computer 14. Five characters would be alpha and five characters would be numerical, i.e., ABCDE 00001. The marking system could be reversed so that the numerical side may be used for the purpose of providing such information as plant, lot number, customer number, account number, document number, etc., while the alpha symbols may reflect a sequential accounting. Once the code is selected and entered, it is encrypted into the form of a data matrix which resembles a crossword puzzle or a checker board. Selected encoded information is distributed at random within this matrix. Typically, the symbology will consist of nothing more than black and white squares once exposed to UV or IR light. ABCDE 00001 is converted into a distinctive checker board data matrix symbology. As items are imprinted, the code changes. Using the example from above, the number increases to ABCDE 00002 and a second unique checker board data matrix symbology is created and imprinted on the second item. The second symbol does not resemble the first one, other than the fact that it consists of black and white squares.

The marking operation can be either operator initiated or clock initiated. The marker itself has a computer in it and is controlled by the enigma card and the modem link. In response to the enigma card and modem link, the marker location computer controls the print heads that actually print this I.D. matrix. The marker also has the software to generate the I.D. matrix from the data provided by the host.

A suitable transporting system, i.e. a conveyor, moves the package modules, or the goods themselves, underneath the print heads at a predetermined speed so that the print heads can imprint the encrypted code that has been established at the host computer on the fabric or goods.

The print machine comprises a closed loop system that monitors the imprinted material as it comes through the line. A detector examines the imprints and detects whether a valid imprint has been made. The detection step is performed using a camera. If a marking error occurs for whatever reason, e.g., the ink runs out or a misprint occurs, a signal or a beacon may be activated to allow the local operator to make a command decision as to whether to continue to print, continue his production without marking, or to stop the process and troubleshoot the problem. The software package counts valid marks and stores this number for transmission to the host computer 14. Ultimately, these valid marks are debited from the host computer bank. The on-line verification reader is typically located six to eight inches down the manufacturing line from the marker. The verification reader reports to the marker location computer, which reports to the host computer 14 at the end of the day or other specified period. If misreads or mismarks occur or the full allocation for the day is not exhausted, the host computer is informed at the end of the day or other period.

Any physical process to which the goods must be exposed preferably occurs before the marking cycle. As an example, cigarettes are placed within a pack before the pack is marked. Preferably, marking of the symbology is the last step in the manufacturing process before the goods enter the stream of commerce. If the product is again packaged, the marking process must be repeated. As an example, cartons are marked after they are packed with 10 packs of cigarettes, and cases are marked after they are packed with 100 cartons of cigarettes. The last inspection for quality control measures preferably occurs prior to the time the package modules are printed so that defective goods are eliminated prior to the time they are imprinted. This becomes necessary to insure that the printed symbol is not erased or destroyed through certain physical process, i.e., the insertion of 10 packs of cigarettes into a carton. Otherwise, the symbols imprinted on the cigarette packs may not survive the carton packing process, and may be lost to abrasion.

In an alternate use of the invention, it might be desirable to mark material early in the manufacture cycle, and trace or read the products at various states of the process until the product is completely finished. In this application, care must be taken in the method used to affix the mark. Using the example of manufacturing blue jeans using prewashed fabric, assume that the manufacture of a pair of "washed" jeans is to be traced by initially marking the cloth used in the process, and then reading the mark throughout the manufacture process which a washing step. Further assume that the identifying marks are printed on the cloth. The ink used must be selected to withstand each manufacturing step, and in particular, selected to withstand the washing step. It has been found that suitable inks are available. Waterproof inks can also be used so goods can be marked at any point of production. More specifically, inks are available that can survive more than fifty commercial washings and have been used to mark rental uniforms for tracking.

The print location controller enters a user I.D. and input data detailing destination, shipping instructions, etc. to the host computer through the enigma cards. The confirmed request or order is transmitted to the marker location computer in encrypted code format by the host PC.

In the case of apparel, the present authenticating system has the advantage that permanent marks are not required, i.e. the marking formulations can be water soluble or soluble in a variety of organic solvents. The general chemical family is classified as derivatives of stilbene fluorescent compounds with emissions in the range of 450 NM when exposed to UV radiation. Thus, for goods that are normally not washed before retail sale, such as jeans, the present disclosure sets forth a system in which temporary markings are placed on the goods. However, the compounds exhibit at least some permanence when used on some products, i.e., leather.

The marks, symbols, or patterns used in the present invention can also be made permanent through the use of permanent chemical agents. Permanent markings can be especially useful with goods that are not typically washed or with goods where accurate product tracking data is highly desirable. As an example, handbags are typically not washed and may have a life in the possession of a consumer of several years. Thus, it may be important to know the source of those handbags even years after the original sale to investigate after market information or product demographics. Even when a handbag is several years old, it can be checked using the present invention to determine the manufacturing lot number and other data contained in symbols which were placed on the handbag during manufacture.

The marks, symbols, or patterns suitable for use in the present invention can include, without limitation, codes such as UPC symbols, data matrix symbols, graphic symbols such as logos, pictures, images, and the like, encrypted data in textual, numeric, binary, octal, hexadecimal, alphanumeric, or the like, or any other data encoding format. The product or package module is marked in a suitable pattern as shown in FIG. 2. FIG. 2 shows a segment of the package module, such as an unfolded cigarette pack. The dotted lines at 32 and 34 represent the paths along which the markings are placed. It is well known in advance of cigarette packaging where the lines 32 and 34 will be located when the cigarette pack is folded and assembled to receive cigarettes. For instance, they can be located on the back and on the bottom of the assembled and loaded pack. The markings are preferably located so that the two lines 32 and 34 assure that the repetitive marking process locates the symbols at the desired locations on each cigarette pack. Alternately only one mark can be applied, or more than two marks can be applied to facilitate the scanning process, especially at the final point of distribution.

In the dual marking example shown in FIG. 2 two sets of markings are applied through the use of two duplicate ink jet printers. Indeed, four or five duplicate ink jet printers can be used in parallel to provide even more markings on five sides of the cigarette pack. When using multiple heads, each head can be programmed to print the same matrix at a different physical location, or each head can be programmed to print different serialized matrices. Alternately, and depending upon the types of print heads used, one nozzle can be used to print clear text data such as ABCDE00001, and the other nozzle can be used to print the equivalent encoded matrix. With each of the above alternate methods of marking, the markings are preferably applied repetitively at the same physical location of each marked article.

Figure 3B:
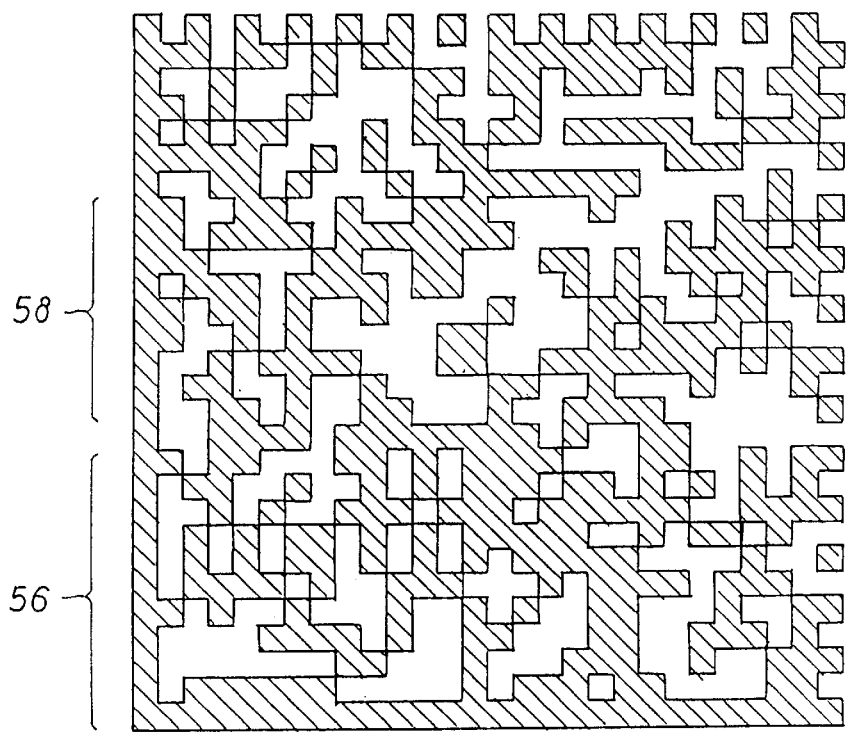
FIG. 3b shows a representative symbol placed on an item.

By way of example, representative symbols are shown in FIGS. 3, 3a, and 3b of the drawings. Without regard to the meaning of the symbol shown in FIGS. 3, 3a, and 3b, it is readily understood that the symbols encode a set of data which enables unique identification of a lot of goods and date of manufacture of these goods. Moreover, the set of symbols shown are particularly useful because the location of the encoded data is not specifically known. For instance, protection against counterfeiting of the numbers for purposes of smuggling authentic, but contraband, products can be implemented. As one example, every symbol in the data indicated by the numeral 56 (shown in FIG. 3b) can be generated by a random number generator and have absolutely no significance. By contrast, symbols in the region at 58 (shown in FIG. 3b) can have significance when decoded. This can be used to enhance the security of the encoded symbol on the bulk cloth. An alternate embodiment is the bar code which is used for UPC identification. While that particular code need not be used, it is acceptable in terms of format.

One preferred procedure for applying the marks to the package modules uses a typical ink jet printer which directs a spray of a chemical formulation onto the modules. The chemical formulation can be an ink or similar composition that can be applied in a predetermined pattern to the modules or, alternately, to the packaged goods. As applied, it is formed into a specific pattern representing either encoded data or raw data. The pattern can be in accordance with the UPC symbols or the like.

In another aspect of the present invention, the ink jet printer applies identifying marks using a dye along with a volatile solvent which evaporates, leaving the markings on the cloth. In this embodiment, the ink used is a proprietary product of Trident, Inc., Bloomfield, Conn. identified as FL-61. Preferably, the markings are of the sort which are not readily visible to the eye, but are readily seen or detected upon exposure to non-visible light sources such as on exposure to UV or IR light which causes the mark to become illuminated or visible to the eye. Of course, the exposure need not make the mark visible to the eye. All that is required is that the mark become detectable in some fashion so that the system can discern the mark, decipher or decode the mark and verify the authenticity of the mark. If desired, a permanent dye can be used.

The anti-contraband and anti-counterfeiting system of the present invention contemplates marking raw materials, intermediate products, products, or package modules of products with a symbol or pattern which conveys authenticating information, storing this information in machine readable format in a computer database, and using a field reader to identify authentic, or counterfeit, or contraband package modules or goods.

The marking aspect of the system of FIG. 1a includes a remote modem which communicates with a host computer 14 and a marker for imparting the patterns or symbols on the goods or package modules or, alternately, on one or more fixtures affixed to articles manufactured or package modules. Preferably, marking occurs at the stage at which the product(s) is manufactured and packaged. In an alternative embodiment, it can also be used to mark bulk material at the time of manufacture. In like fashion, the system of FIG. 1a can be used to mark paper, cardboard, leather or plastic, e.g., cellophane, waterproof sheet plastic, woven nylon cloth, etc. In that instance, the material is preferably spooled into a bolt, shipped to the plant, and then unspooled as the material is used in fabrication. At that stage, the material can also be marked. Without regard to the point in time, the material is marked with a set of symbols.

Attention is now directed to the marking system of FIG. 1a and the embodiment of the system shown in FIGS. 4a–4c, which will be described in detail. As an example, items being marked can be package modules comprising packs containing 20 cigarettes. The system/host computer protocol operates as follows. The marker system 16 waits for the host computer 14 to call and download ID string (ABCDE) and the start/stop print sequence codes for the specific print cycle. Again, for purposes of discussion, it is assumed that the marker system 16 is a printing system and that the marker 20 is a printer. Print data is stored in memory on the enigma card. The ink jet printer head 44 is positioned at the requisite location to direct an ink jet onto the product. The ink jet printer head 44 preferably applies an ink which is formed of two components, a dye and a solvent or carrier. The solvent is volatile and evaporates so that the dye is left on the marked package module. In this particular instance, the preferred dye is one which is not visible when impregnated into the paper of the cigarette pack. In a preferred embodiment, no marking is seen in ordinary light by the unaided eye. Rather, the marking is visible when irradiated with a special wavelength of light as described. At the end of a print cycle, the marking system 16 calls the host computer 14 to upload the total print count for that cycle.

In one preferred embodiment in which the symbol is printed, the marking system 16 is comprised of an enclosed single 256/32 channel print head mounted at 90° to the path of the product or Dual 96 orifice/32 channel print head mounted at 27 degrees to the path of the product. The print heads are mounted on a swivel bracket assembly with a detent home position. The print heads are controlled by the print location computer, which accepts data for generating printed images from the host computer 14 via modem. The print location computer will typically be a personal computer. The data can be ASCII or graphic images. The print head(s) alignment is suitable for applications needing 64 bits of vertical resolution. The software is designed to print graphics images that are 64 dots vertical and 16 dots horizontal. By utilizing the printer bolderization parameters, the horizontal resolution can be extended to any integer multiple from 1 to 10.

Figure 4B:
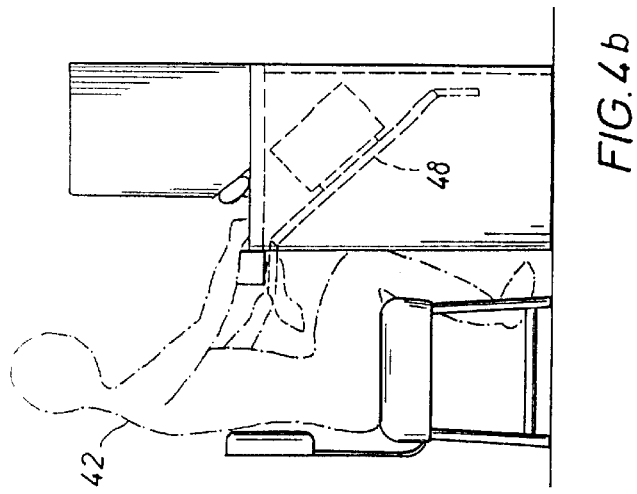
FIG. 4b is a side view of a item marking machine in accordance with the teachings of the present disclosure.
Figure 5:
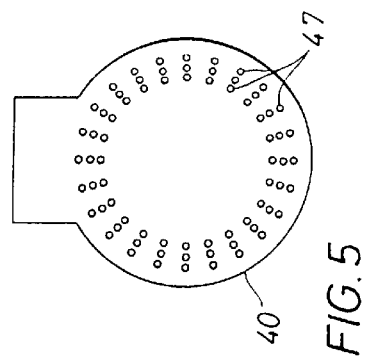
FIG. 5 is a top view of a item carrier detailing the vacuum ports.
Figure 4A:
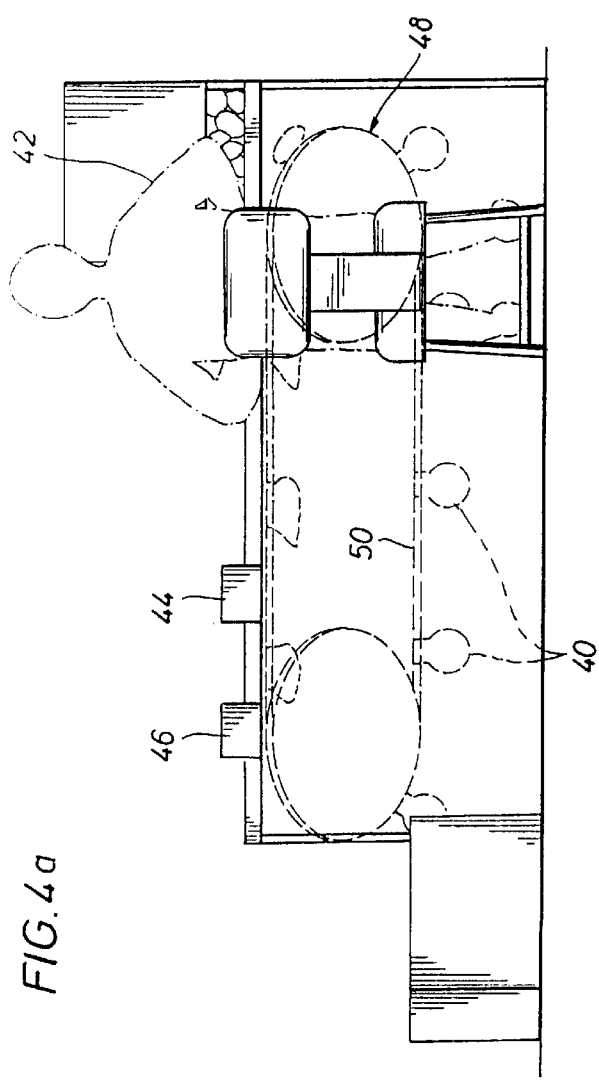
FIG. 4a is a back view of a item marking machine in accordance with the teachings of the present disclosure.
Figure 4C:
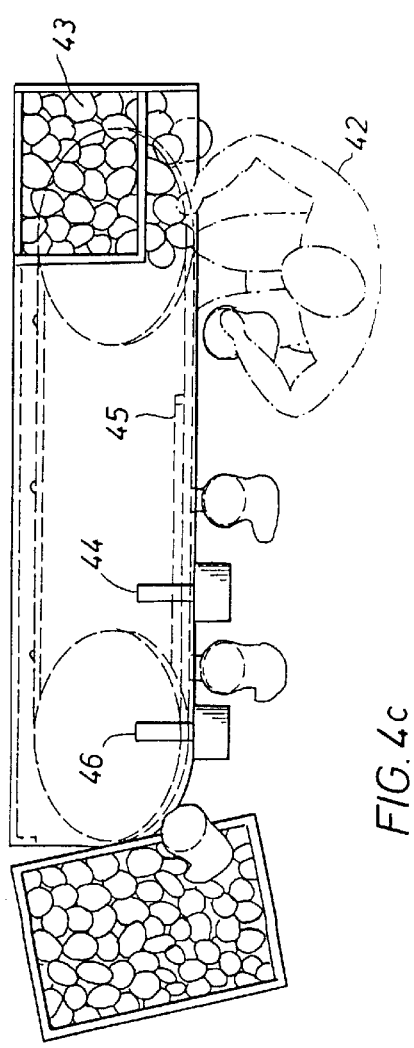
FIG. 4c is a top view of a item marking machine in accordance with the teachings of the present disclosure.

The goods package modules, which are cigarette packs in the example being discussed, are positioned for marking on a conveyor station as shown in FIGS. 4a–4c. The conveyor station package module carrier pads 40 (shown in detail in FIG. 5) in front of an operator 42 who positions the "to-be-marked" section of package modules to be marked 43 on each pad 40 as the appropriate section passes by the operator 42. The to-be-marked section is smoothed and held by air-suction provided by engaging a carrier suction actuator 45 through the vacuum ports 47 on the pads 40 while it is being transported from the operator 42 to and under an ink-jet printer head 44 and optical print verification detector 46. The suction is then removed, and the marked package module is released.

A narrow electric-motor driven belt with multiple carrier pads 40 attached at spaced intervals circulates around an elongated oval track powered by a transport drive 48. In a preferred embodiment, ten carrier pads 40 are spaced at eighteen inch intervals. A straight section of the track in front of the operator 42 exposes the pads 40 for loading and connects the pads 40 to a vacuum system that provides the suction. At the far end of the straight track, beyond the print-head location, the vacuum connection is broken and the belt and pads curve around a drive-pulley under protective cover to begin their return to the loading operator 42.

A horizontal motor-driven conveyor belt 50 parallels the straight section of track along a line just below the carrier pad 40 to support and move package modules while their to-be-marked sections are on the carrier pads 40. The speed of the carrier pads 40 and the conveyor belt are perfectly synchronized so that the to-be-marked sections remain fixed on the pads until ink marking and checking are complete. The synchronized speeds are infinitely programmable over a range depending upon the complexity of the package module being marked and operator skills.

Once the items such as package modules or articles of manufacture or materials have been marked, the goods can enter the stream of commerce. Goods can be inspected at remote locations to determine whether the goods are authentic, i.e. whether the goods have an authentic mark or symbol which can be confirmed. In addition, specific information provided by the mark or symbol can aid in the tracking of authentic goods, i.e. whether authentic goods have been smuggled as contraband at an unauthorized point of distribution. Finally, counterfeit goods can be detected by the absence of any authentic mark or symbol.

Attention is directed specifically to the problem associated with the manufacturing operation and the flow of goods defined as "diversion". As an example, cigarettes made in Azerbiajan may be destined for Ankara, Turkey to a Turkish distributor with the stipulation that they are only to be sold in Turkey for taxation or other reasons such as sales agreements and the like. However, the distributor seeking to make a greater profit may sell the cigarettes into Afghanistan at a greatly inflated price. These sales are against the interest of the manufacturer because the national distributors in the areas where these goods are diverted may not be able to compete or lose the value of their distributorship. As stated and discussed previously, excise tax problems might result from the illicit sales. The system of the present disclosure is useful to prevent diversion.

The marker operator may provide the host computer 14 with detailed shipping information so that the host computer can modify the code to include this information. The marker controller may have the functionality to provide information to the host computer or the host computer controller may enter this information so that the information would be associated with the marks or symbols imprinted on the goods destined for a particular region of the world or market. Alternately, the information may be supplies by the control computer 12 at the company headquarters, and downloaded to the host computer 14 servicing the affected region of distribution (i.e. the Azerbiajan region in the example being presented).

The mark controller may be able to associate a particular run of goods or package modules with a purchase order. Where this is feasible, the goods become associated with a piece of commercial paper, thus facilitating enforcement of legal rights by providing supporting documentation. The preferable mode of operation is to utilize the system on a daily basis or the shortest period of time that is practical to enable control over the marking system and to accommodate changes in the code to reflect destination information.

The only information that the print controller will have at its disposal is a warning, i.e., low ink, low temperature on the print head, high temperature on the print head or some sort of malfunction and a screen which instructs him on how to troubleshoot the problem. If an emergency shutdown of the line occurs, a system lockout results and a supervisor must insert a key to restart the whole system again. This serves as a physical security measure.

The host computer 14 or marker can be informed of a run change so that the symbology can also be changed. This can be done on a real-time basis, and implemented by commands from the control computer 12 or the operators of the host computer.

The time, the date, the type of product, the count, the location of manufacturing, destination, the ordering customers, the user ID and password of the supervisor or marker operator, the individual user ID and password of the authorized person or persons, and any routing customer information typically is represented by the symbology. Regardless of whether the code is random, sequential, or logically created in terms of the ten character preferred embodiment scheme, this information needs to be associated with the symbology.

The marker location computer will also interface with an optical reader 46 to verify product marking. The optical reader scans the marked products and cross references the scanned information with the encoded data. This procedure insures that the imprinted marks or symbols are properly placed on the goods package module and allows confirmation that the appropriate marks or symbols were placed on the appropriate goods or materials.

After the package module has received its marking from the marker, the module is scanned by a reader to confirm a valid marking. A camera is positioned to verify that a readable print has been made and that the information conveying positions of the symbols are readable.

The camera is preferably a charge couple device (CCD) camera. It is a black and white television camera with a solid state image center. However, any detection means capable of capturing the image is envisioned by the present disclosure.

The CCD camera illuminates the mark with UV or IR light and the CCD camera will capture the UV or IR illuminated image. The captured information will be fed to the computer which will verify that the expected print actually was printed. Either a match is obtained or not. If no match is obtained, the marker computer indicates a problem with the marker to the marker controller and to the host computer. As an example, if the marker is a printer, a plugged nozzle in the print head can affect print quality adversely and prevent the field reader from capturing the image so that it can subsequently be decoded. This cross referencing system allows early detection of marking problems before too many marks are printed that are unreadable.

The marking system operates generally as follows.

An I.D. matrix is generated. The marker PC instructs the print head to print the matrix. The matrix will be saved and compared to the captured and processed image from the CCD camera and which compares the scanned mark with the mark generated by and stored in the database to determine the existence of a match. If a match is not made, a bad mark reading signal is received at the marker PC. In this manner, the marker operator is informed of a potential problem.

With the I.D. matrix, redundancy is built into the matrix system so that it is possible that even a poor quality mark can still be readable.

The validation occurs through the marker location computer. The matrix originates as a result of communication between the host computer 14 and marker location enigma cards, but, once created, the matrix itself is stored in the marker location computer. Marks can be debited or accounted for after verification if so desired.

The fourth component of the system is the field reader. The field reader is preferably a hand held device housed in a briefcase or the like. The briefcase typically comprises a power pack battery source, a laptop computer, and a hand held reader that is connected to the laptop computer. Alternately, the field reader can be a table top device connected to 110 volt AC "house" power.

Figure 6:
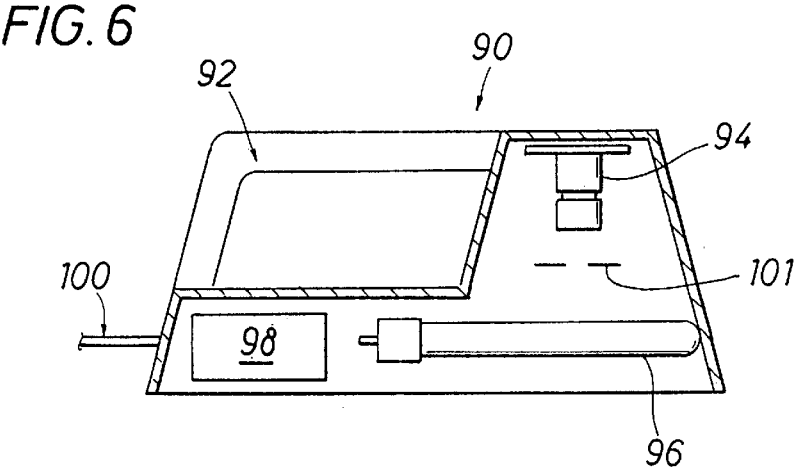
FIG. 6 is a side view of a hand held field reader.

The hand held version of the field reader will first be discussed. FIG. 6 shows a side view of a hand held reader. The hand held reader 90 has a handle 92, a CCD camera 94, a light source 96, an electronics module 98, a narrow band-pass filter 101, and a cord 100 for connection to the central processing unit. FIG. 7 shows the circular configuration of the light source 96.

The means for detecting or reading the activated mark can be a bar graph reader such as is used to read the universal product code symbols (UPC hereinafter) in the case where the mark is a bar graph or any other type of reader used in conjunction with other arbitrary marks, symbols, or patterns. Preferably, a data block can be printed on the goods or modules used to package the goods, such as a cigarette pack or carton of cigarette packs, where the data block includes light and dark areas (treated and untreated areas) in a given arrangement that can be read and converted into an encoded data entry or raw input data.

For reading, the encoded marks are read by illumination with the required IR or UV source. When the mark is overprinted onto an existing visible mark such as a trademark or a logo, symbols printed in IR activated ink, and illuminated with one or more IR light sources, are preferred. Once obtained, the symbols are compared by manually comparing the marks or by using an optical scanner connected to a computer whereon there is a database containing the various range of entries. Such a database will commonly be stored in a table structure utilizing commonly available database software. This database of values, commonly seen in a "look up" table, provides the appropriate codes marked onto the garment. The data base can be arranged to cross-reference and cross-validate various arrays of information that have been encoded. For example, the database, in the form of a look up table, can conveniently provide data indicative of origin. Should the markings be counterfeited or contraband, there is no basis by which the counterfeit manufacturer or the smuggler will know the appropriate origin and destination data, thereby increasing the possibilities of detecting counterfeit and contraband goods. This system particularly aids in the protection of national markets and customs inspections which are made at international borders.

Referring again to FIG. 6, the CCD camera 94 captures the image and extracts the matrix out of that image so that it can be stored in memory along with other information provided to the field reader 18, such as the location of inspection, etc. The reader has the capability to decode the matrix. In one embodiment, this function is disabled to prevent any compromise of the security of the overall system. The reader merely captures the I.D. matrix and transmits the image back to the host computer 14. Then, either on-line or at a later time, the field reader 18 calls up the host 14 and downloads the series of ones and zeros. The host computer 14 has the ability to decode the I.D. matrix and determine if a valid or invalid code is present. In addition, the host can utilize all the encoded information to inform the inspector concerning tracking/diverting problems. In an alternate embodiment, the reader 18 decodes the image and transmits an ASCII string representing the image back to the host 14 for authentication, rather than transmitting the total image.

Upon inspection at various locations, e.g., customs inspection stations, the goods are scanned for a representative mark or symbol. Either confirmation of marking or confirmation of specific data can be determined. This may require modem 26 (see FIG. 1b) connection between the local reading terminal 22 and the host computer 14 where the encoded information is secured and stored. Comparison of the mark or symbol with the stored data enables both detection and tracking of authentic goods, as well as detection of counterfeit goods lacking the necessary mark or symbol of authenticity.

In a preferred embodiment, the host computer 14 utilized in the encoding/decoding system consists of a personal computer with serial and parallel interface, VGA monitor, keyboard, an Intel 100 MHz 586 processor, a 1.0 GHz HDD, 3.5" FDD, and 19200 baud modem. The host computer 14 is interfaced with an encoder/decoder which generates or decodes matrix codes for downloading to the marking system 16. In addition, the host computer 14 accepts data from field readers and interfaces with the encoder/decoder to authenticate the captured matrix and then returns a valid/invalid signal to the field reader. As mentioned previously, the host computer 14 can alternately receive the image from the field reader 18 as an ASCII string.

The host computer 14 maintains a non-volatile record of serialized encoded messages downloaded to each marking system location, maintains production run data for each remote marking system, and maintains a database for the field reading system to aid in product tracking and authentication. In a preferred embodiment, the host computer communicates with field readers via ASCII 7 bits, 1 odd parity bit, 1 stop bit and 1 start bit. This communication allows the field readers to provide data to the host computer which can be processed, thus enabling detection of authentic and counterfeit goods.

In the preferred embodiment, the markings are made visible by irradiating light from a special lamp. The lamp provides a selected wavelength of light which illuminates the mark or symbol. As an example, UV and IR light may be used to illuminate printed marks utilizing UV and IR sensitive dyes as described above. An ink is selected which is compatible with a selected wavelength of light. In marking financial documents, the preferred light is IR which illuminates IR responsive dye. The preferred light form is UV light which collaborates with a UV responsive dye. When irradiated, the markings are then visible to a reader.

The field reading system 18 is used to verify valid product marking at any point in the distribution chain from the marker to the retail outlet. The portable reader consists of a video or digital camera system with selected light sources for image acquisition (i.e., IR, UV and white light), a personal computer controller and software to capture, store, and enhance the quality of the image, and a modem for communicating with the host computer.

The host computer/field reader communication protocol is as follows. In a preferred embodiment, the field reader transmits I ASCII, 7 data bits, 1 odd parity bit, 1 stop bit, and 1 start bit. The field reader will also transmit an identification header (12 character text string), operator name (20 character text string), operator name (20 character text string), location, (20 character text string), and a digital image. The digital image is a 256×256 8 bit scale image transmitted in raster pattern from upper left to lower right pixels of the image.

The host computer 14 accepts remote field reader data, interfaces with the encoder/decoder, and returns a valid/invalid message to the field reader. The host computer 14 also provides the field reader with data listing all previous verifications of the encoded message in the form of date, time, location, operator, and valid/invalid status.

The inspecting agent can inspect different package modules or goods produced under the control of one of a plurality of host computers 14 of a single manufacturing company. Within a single manufacturer, however, their symbology is proprietary. A manufacturer would not, for instance, even with identical equipment, be able to read another manufacturer's code. Each network has proprietary symbology developed specifically for that client. The invention can, however, be used by customs agents to scan products from multiple manufacturing companies. In this application, custom inspectors use the reader system by capturing the image and pressing a button to indicate a certain manufacturer. As a practical matter, inspection occurs through the use of private inspectors and with customs personnel. The manufacturer actually pays for a campaign, i.e., a cycle or a 3 to 6 month campaign, depending on how extensive an inspection the manufacturer desires. The invention places into the hands of the customs agents and/or paid manufacturer field representatives a foolproof method of capturing the encoded images on goods and verifying that the goods are indeed legitimate or properly routed without expensive or extensive training. An added advantage of this system is the implementation of a system that avoids all the paperwork that the customs people would ordinarily require in inspections and making inspections more readily accessible.

The system does not require that the inspection agent operating the reader system even focus the camera. All that is required is that the reader system be turned on. The reader system is packaged in a briefcase and is typically comprised of a laptop computer, a battery pack and the hand held reader. The hand held reader may be attached by an umbilical cord or may operate independently of an umbilical cord. In addition, the reader may read a certain number of garments, capture the information and subsequently be plugged into the laptop computer to download the information from the hand held reader to the laptop.

Another possible option uses a radio frequency transmission from the hand held reader back to the laptop. Regardless of the available technology, i.e., umbilical cord, radio frequency, or satellite, the information is captured and then downloaded. The information typically is going from an analog to a digital signal and into the laptop computer. An automatic dial up modem connects the laptop to the manufacturer's host computer. The host searches its archives for the captured information. The encryption unit decodes it and a signal is sent back to the laptop creating a display on the laptop screen which indicates whether the product is valid or invalid. Also, information relating to previous inspection time, dates, and places can be placed on the screen. In other words, the goods can be traced anywhere along the distribution chain where those goods have been read or that shipment has been read and this information is archived in the host computer 14.

Once the image has been illuminated by the hand held reader, that image is captured and transferred to the laptop. An additional software package within the laptop enhances the image. The image is cleaned up in the laptop prior to transmission. If some fuzziness is present or the contrast is poor, the software package cleans up that image, in a manner known in the art, prior to transmitting back to the host computer 14 so that poor quality data is not transmitted. Once the mark has been verified as authentic, the inspector moves on to his next assignment. This inspection can be done in a department store or at any place along the distribution chain i.e. customs or trucking terminals, flea markets, department stores, etc.

Each laptop or hand held reader is preprogrammed to recognize the user. When a user logs on, it identifies nomenclature chosen to establish communication with the appropriate computer. To gain access to the host computer 14, the field inspector must properly identify himself. This may include a password in addition to his name. There will be a reader I.D. and an inspector I.D. The field inspector will be asked to enter his location, and then the time and date is automatically entered.

The laptop and the reader equipment can be purchased off the shelf. The CCD camera is commercially available also, but the light source has been added to illuminate the marks. The packaging of the components to make it user friendly is an aspect of the present invention.

The system also captures inspection and routing information. It actually tracks the actual routing through each inspection station or check point. For example, if a case of cigarettes from the Azerbaijan plant were routed through Cyprus to Ankara, Turkey, and the case showed up in Krakow, Poland, automatically it becomes apparent that there is a problem. Routing information may be displayed on the laptop screen so that the inspector will be informed of the goods destination and proper routing.

An audit trail is created through inspection that evidences what the field inspectors inspected and whether they check or merely spot check all of the goods. When an invalid signal is received, this information can be stored. For both valid and invalid readings, the host computer will mark the code in the database indicating it was read on a particular date at a particular location. And if that item is read two or three places along the distribution chain, all that information will be in the host and will be downloaded to the laptop at the time that the mark is read. If counterfeit or diverted goods are identified, the field unit has the software that allows a manual input of bills of lading and purchase order data and/or the fact that it was obtained after inspection. The entire tracking process can be audited by electronically auditing the enigma cards which provide security between the host computer and the enabling control computer.

The system thereby enhances the quality of data gathered by the reader system. This is one of the prime objectives of the present invention. The field reader can be used to scan bills of lading and/or purchase orders so that such documentation can be associated with inspected goods.

In the U.S. or in highly developed countries where a sophisticated telephone system exists, a modem serves as the means for transmitting information from the field reader to the host computer and back to the field reader the previously disclosed embodiments. Also, in highly developed countries such as the U.S., transmission via cellular telephone is possible.

If on the other hand, inspection in third world countries is necessary, a satellite system is available that will allow the field reader to uplink to the satellite, down to a ground station, and back to the host. Whether it is the reader to the host or whether it is the marking system to the host, in terms of modems and phone lines, the Internet, satellite, private phone lines, private satellite systems, any commonly known method of transmitting data may be employed. Digital data will be transmitted by the most convenient method.

The system can be embodied in many useful ways other than those described above. As one additional example, random matrices ABCDE00001 through ABCDE99999 are printed on a product without any prior knowledge of the destination of the product. At a later time, when the final product destination and the customer are known, the imprinted matrix mark is first read on each product marked with a fixed or a portable reader. The matrix mark is decoded to clear text, such as ABCDE00001, and then converted to an ASCII string by means of the CPU in the reader. The ASCII string is next transmitted to the host computer. At the host computer, the now know customer and destination of the product are assigned to the identifying mark and stored within the database of the host computer. Information in the data base, which now consists of an identifying mark on the product and the corresponding customer and destination of the product, allows the product to be subsequently authenticated and tracked using methods described previously. Again, the entire process can be audited by electronically auditing the enigma cards which provide security between the host computer and the enabling control computer.

While the foregoing is directed to the preferred embodiment, the scope thereof is determined by the claims which follow.

What is claimed is:

1. A method of marking and tracking goods from place of manufacture to place of final distribution, the method comprising the steps of:
   (a) providing a control computer to control and enable a host computer by providing an allotment of encoded symbols indicating said place of final distribution;
   (b) enabling said host computer to direct a printer at said place of manufacture to print an encoded symbol from said allotment of encoded symbols on said goods thereby forming marked goods;
   (c) enabling said host computer to direct a second printer at said place of manufacture to print said encoded symbol on a package containing a plurality of said marked goods thereby forming a marked sized package of marked goods;
   (d) scanning said marked goods and said marked sized packages with a field reader to capture said symbol imprinted thereon; and
   (e) verifying the authenticity of said symbol.

2. The method of claim 1 wherein said verification of authenticity of said symbol comprises the steps of:
   (a) transferring said captured symbol to said host computer;
   (b) comparing within said host computer said captured symbol with a data base of authentic encoded symbols; and
   (c) transmitting to said field reader an indication of the result of said comparison.

3. The method of claim 2 comprising the additional steps of:
   (a) providing a plurality of said host computers wherein
      (i) said control computer provides an allocation of symbols to each host computer unique to that host computer and unique to a final place of distribution, and
      (ii) each host computer controls two or more printers to print said symbols onto said goods and onto said sized packages of said goods at said place of manufacture; and
   (b) directing said plurality of host computers with said control computer.

4. The method of claim 3 comprising the additional step of locating each of said host computers remote from said control computer.

5. The method of claim 4 comprising the additional step of locating at each of a plurality of places of manufacture, a set of said two or more printers, wherein a single host computer controls said plurality of sets of printers.

6. The method of claim 3 comprising the additional steps of:
   (a) providing a plurality of said field readers controlled by one of said host computers;
   (b) transferring said captured symbol from each said field reader to that host computer;
   (c) comparing within said host computer said captured symbol with a data base of encoded symbols; and (d) transmitting to each said field reader capturing said symbol an indication of the result of said comparison of symbols captured by that field reader.

7. The method of claim 1 wherein the step of scanning said marked goods comprises illuminating said symbol on said marked goods with a light source having a specified frequency range to illuminate said imprinted symbol.

8. The method of claim 1 wherein said host computer is enabled by said control computer through a security device comprising an enigma card.

9. A method of marking and tracking goods and sized packages of goods, the method comprising the steps of:
   (a) providing a control computer to control and enable a plurality of host computers by providing an allotment of encoded symbols to each said host computers, wherein each host computer is provided with symbols indicating a unique place of distribution of goods;
   (b) enabling each said host computer to direct a plurality of printers to print an encoded symbol onto said goods and said sized packages of goods, wherein
      (i) at least one printer is located at each of a plurality of places of manufacture of said goods, and
      (ii) each symbol indicates the place of manufacture of said goods;
   (c) scanning said goods with a field reader, which cooperates with a specific host computer and is located at each said place of distribution, to capture said symbol imprinted thereon;
   (d) verifying the authenticity of said imprinted symbol using said captured symbol; and
   (e) verifying said place of distribution using said captured symbol.

10. The method of claim 9 wherein said host computer is enabled by said control computer through a security device comprising an enigma card.

11. The method of claim 9 wherein said verification of authenticity of said symbol comprises the steps of:
   (a) transferring said symbol captured by said field reader to said cooperating host computer;
   (b) comparing within said host computer said captured symbol with a data base of encoded symbols; and
   (c) transmitting to said field reader an indication of the result of said comparison.

12. The method of claim 11 wherein said verifying said place of distribution using said captured symbol comprises the steps of:
   (a) transferring said symbol captured by said field reader to said cooperating host computer;
   (b) extracting from said captured symbol product identification and destination information and comparing this information with intended place of distribution information stored within said host computer, and
   (c) transferring to said field reader the results of said comparison.

13. The method of claim 12 comprising the additional steps of:
   (a) providing said field reader with a CPU;
   (b) converting said captured symbol into an ASCII string within said CPU; and
   (c) transmitting said captured symbol to said cooperating host computer in the form of said ASCII string.

14. The method of claim 9 including the additional steps of:
   (a) scanning said imprinted symbol at said place of manufacture of said goods; and
   (b) verifying the accuracy of said imprinted symbol prior to distribution of said goods.

15. The method of claim 9 wherein the step of scanning said goods comprises illuminating said symbol on said goods and said sized packages of goods with a light source having a specified frequency range to illuminate said imprinted symbol so that said symbol can be captured by said field reader.

16. The method of claim 13 comprising the additional steps of:
   (a) verifying the authenticity of said symbol by comparing said captured symbol with a database of authentic symbols stored with said field reader CPU, and
   (b) verifying the destination of said goods by comparing product identification and destination information extracted from said captured symbol and comparing this information with intended place of distribution information stored within said field reader CPU.

17. The method of claim 9 wherein:
   (a) said product comprises a package of cigarettes; and
   (b) said sized packages comprise cartons of packages of cigarettes and cases of cartons of cigarettes.

18. The method of claim 9 wherein:
   (a) said places of manufacture comprise tobacco product manufacturing facilities;
   (b) each said facility comprises a plurality of production modules; and
   (c) each type of product and each sized product package from each production module is marked with a designated printer.

19. A system for marking and tracking goods and sized packages of goods, comprising:
   (a) an enabling control computer;
   (b) at least one host computer in communication with said control computer;
   (c) at least one printing system comprising
      (i) a printer CPU in communication with said host computer, and
      (ii) an symbol printer; and
   (d) at least one field reading system cooperating with each said host computer;
   (e) wherein
      (i) said control computer communicates with said host computer through a first coded communication to enable said host computer to coordinate marking of said goods and sized packages by providing said host with said allotment of symbols.
      (ii) said host computer communicates with said printer CPU through a second coded communication to enable said symbol printer to print said symbols as a pattern onto said goods and sized packages of goods,
      (iii) a first portion of said symbol is indicative of the intended place of distribution of said goods,
      (iv) a second portion of said symbol is indicative of the place of manufacture of said goods,
      (v) said field reading system scans said goods thereby capturing said symbol marks,
      (iv) said field reading system communicates with said host computer to compare said captured marks with a set of authenticated patterns entered into a data base on said control computer, and
      (iiv) said field reader compares said scanned intended place of distribution with an actual place of distribution.

20. The system of claim 19 comprising an encryption unit cooperating with said host computer to form said second coded communication.

21. The system of claim 19 further comprising verification means comprising a CDD camera, wherein said CDD camera scans said symbols applied to said goods and packages of said goods and compares the scanned symbols with the intended symbol markings encoded at and stored in said printer CPU.

22. The system of claim 21 wherein said field reading system comprises a PC.

23. The system of claim 22 further comprising a field reading system communication means, wherein:
    (a) said field reading system scans goods and sized packages of goods and captures said symbol at various points in a product distribution system;
    (b) said PC transmits said captured symbol to said cooperating control computer for verification, and
    (c) said control computer transmits via said communication means the results of said comparison to said field reader PC.

24. The system of claim 23 wherein said communication means comprises satellite communication.

25. The system of claim 23 further comprising a PC software system wherein;
    (a) said software system distinguishes said first portion of said captured symbol comprising place of distribution information and distinguishes said second portion comprising place of manufacture information; and
    (b) said PC transmits information in said first and said second portions to said host computer and decodes and presents in clear text information in said second portion at said field reader.

26. The system of claim 25 further comprising a data base of valid symbol markings stored within said PC, wherein said captured marks are compared with authentic symbol markings encoded at and stored in said data base of said PC.

27. The system of claim 19 further comprising a security modem cooperating with each of at least said at least one host computers, wherein said cooperating security modem passes only said first encoded communication directed to a specific host computer from said control computer.

28. A system tracking the distribution of goods, the system comprising:
    (a) a control computer;
    (b) at least one host computer which is provided an allotment of marks by said control computer, wherein
        (i) a first portion of said mark is indicative of intended place of distribution of said goods, and
        (ii) a second portion is indicative of the identity of said goods;
    (c) at least one printing system enabled by said host computer with said allotment of marks for imprinting onto said goods;
    (d) at least one field reader to capture said marks imprinted thereon; and
    (e) means for verifying the authenticity of said marks.

29. The system of claim 28 wherein said means for verifying the authenticity of said marks comprising:
    (a) a means for transferring said captured mark to said control computer;
    (b) a data base of authentic marks stored within said control computer, wherein said captured mark is verified by comparison with said data base of authentic marks;
    (c) a second means for transmitting to said field reader an indication of the result of the comparison; and
    (d) a third means for transmitting information scanned by said field reader to said control computer.

30. The system of claim 29 wherein said field reader is remote from said host computer, and said host computer is remote from said control computer.

31. The system of claim 28 comprising a plurality of printing systems is enabled by a single host computer.

32. The system of claim 28 comprising a plurality of host computers enabled with said control computer.

33. A method of marking and tracking goods, the method comprising the steps of:
    (a) providing a control computer to control and enable a host computer by providing an allotment of encoded symbols to said host computer, wherein said host computer is provided with symbols;
    (b) enabling said host computer to direct one or more printers to print an encoded symbol onto said goods;
    (c) scanning said goods with a reader, which cooperates with said host computer, to capture said symbol imprinted thereon;
    (d) transmitting said scanned symbol;
    (e) assigning an associated destination to said symbol; and
    (f) storing said symbol and said associated destination in a memory of said host computer thereby creating a database of authentic symbols and associated destinations.

34. The method of claim 33 wherein said tracking of goods comprises the additional steps of:
    (a) subsequently capturing said symbol imprinted on said goods with a field reader;
    (b) transferring said captured symbol to said host computer;
    (c) comparing within said host computer said captured symbol with said data base comprising said authentic symbols and associated destinations; and
    (d) transmitting to said field reader an indication of the result of said comparison.

35. The method of claim 34 comprising the additional steps of:
    (a) providing said field reader with a CPU;
    (b) converting said captured symbol into an ASCII string within said CPU; and
    (c) transmitting said captured symbol to said cooperating host computer in the form of said ASCII string.

36. The method of claim 33 wherein said host computer is enabled by a control computer through a security device comprising an enigma card.

37. The method of claim 36 wherein distribution of said goods is audited by electronically auditing said enigma card.

* * * * *